Feb. 15, 1966  J. LYNES  3,235,017
EARTH BOREHOLE DRILLING AND TESTING TOOL
Filed June 28, 1962  2 Sheets-Sheet 1
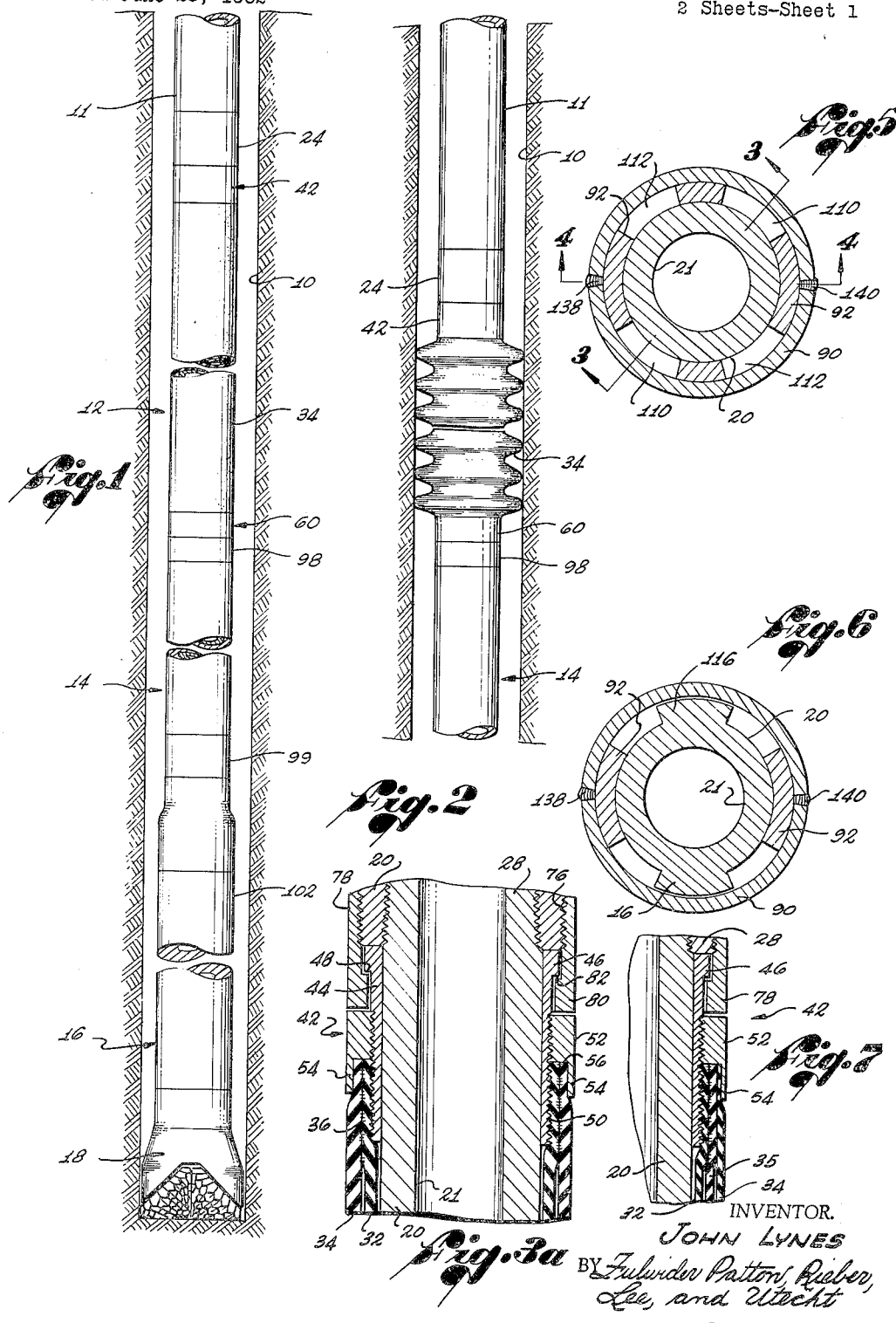
INVENTOR.
JOHN LYNES
BY Fulwider Patton, Rieber,
Lee, and Utecht
ATTORNEYS

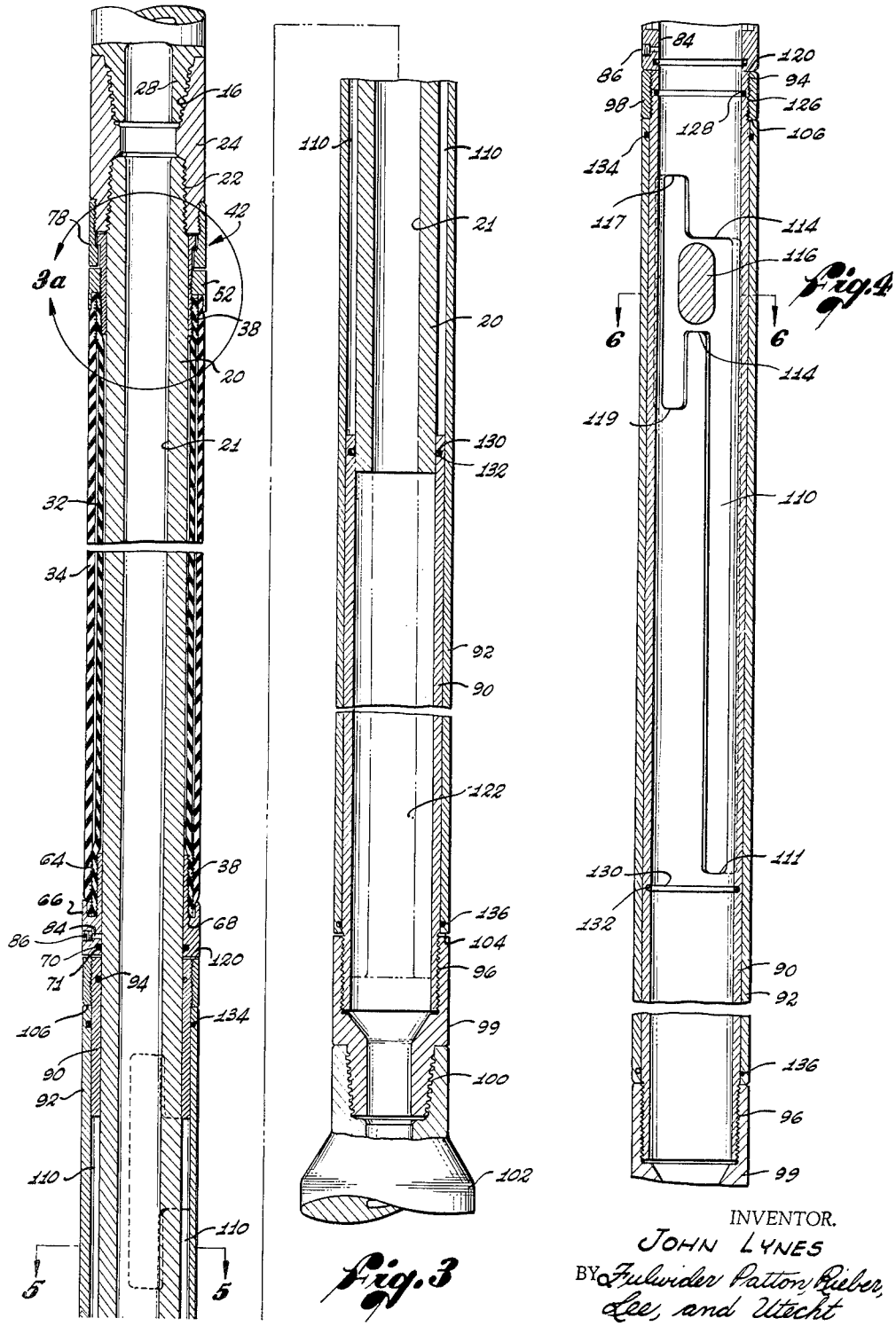

United States Patent Office 3,235,017
Patented Feb. 15, 1966

3,235,017
EARTH BOREHOLE DRILLING AND TESTING TOOL
John Lynes, Lakewood, Calif., assignor, by mesne assignments, to General Oil Tools, Inc., Phoenix, Ariz., a corporation of Arizona
Filed June 28, 1962, Ser. No. 206,092
11 Claims. (Cl. 175—321)

This invention relates generally to earth borehole drilling apparatus, and more particularly to apparatus by means of which the fluid contents of earth formations being penetrated by the drill bit can be tested frequently and at any time during such drilling operations, without withdrawal of the drill stem from the borehole.

Heretofore, it has usually been necessary, each time a formation production test was made, to discontinue drilling and to withdraw the stem, including the drill pipe, drill collar, and drill bit entirely from the borehole, then run into the borehole the desired testing tool, including the string of pipe or tubing by which the testing tool is suspended and manipulated, then perform the testing operation, then withdraw the testing tool and pipe or tubing from the borehole, and finally reinsert the drill stem for resumption of drilling. Thus, for each formation test, it has been necessary to perform two round trips or a cycle of four, time consuming and costly operational steps, and in many present day deep well drilling operations in search of oil and gas at depths often below twenty thousand feet, each of the steps may require several hours, with completion of the whole cycle of steps requiring as much as an entire day or more.

In addition to the costliness of such time consuming testing operations, they have the serious technical disadvantage of making it impossible to test an earth formation promptly following its penetration by the drill, but instead require such formation to remain exposed to the hydrostatic pressure and attendant infiltration of drilling fluid for a prolonged period of time before the test can be made. Such delay and attendant drilling fluid infiltration often vitiates the significance of the test, when finally made, and may also permanently harm the subsequent productivity of the formation.

It is, accordingly, an object of this invention to provide an improved formation testing system, which overcomes the foregoing disadvantage of such testing systems heretofore employed.

It is, similarly, an object of this invention to provide a combined drilling and testing apparatus by means of which, at any time during drilling operations, drilling may be temporarily suspended and, without withdrawal of the drill stem from the borehole, a formation production test can be made.

It is a further object of this invention to provide a combined drilling and testing tool, by means of which a formation production test can be performed substantially immediately upon initial penetration by the drill bit of the formation desired to be tested, thereby reducing the time interval prior to making the test, during which such formation is subjected to the hydrostatic pressure of the drilling fluid in the borehole and the attendant detrimental and contaminating infiltration of drilling fluid.

It is a still further object of this invention to provide means by which, at any time during drilling, the annulus between the drill string and borehole wall can be immediately packed off, thereby isolating the lower portion of the borehole adjacent the drill bit from the upper portion of the borehole, thereby permitting the hydrostatic pressure of the drilling fluid in the borehole to be either removed from the penetrated formation adjacent to the drill bit or, if desired, to be increased by pressurization through the drill pipe as, for example, when it is desired to introduce treating fluids into the pervious penetrated formations.

The objects of this invention are attained in general by providing apparatus combining a drill stem and packer device, which packer device remains on the drill stem adjacent the drill bit at all times during drilling operations and which, through manipulation of the drill stem, can be set in sealing engagement with and retracted from engagement with a surrounding borehole wall at any time without the necessity of removal of the drill stem from the borehole being drilled.

These and other objects, advantages, and features of novelty will be evident hereinafter.

In the drawings, which show by way of illustration a preferred embodiment of the invention and in which like reference characters designate the same or similar parts throughout the several views:

FIGURE 1 is an elevational view of the general assembly of the apparatus of the invention including the drill stem and the testing tool mechanism, as it appears in drilling position in a typical earth borehole.

FIGURE 2 is a longitudinal elevational view similar to FIGURE 1, showing the apparatus of the invention in position in an earth borehole with the packer device set in condition for a formation testing or treating operation.

FIGURE 3 is an enlarged longitudinal sectional view of the assembly of the apparatus of FIGURE 1, the section being taken along a longitudinal plane located as indicated by line 3—3 of FIGURE 5.

FIGURE 3a is an enlarged detailed longitudinal sectional view of the portion of FIGURE 3, shown encircled by line 3a.

FIGURE 4 is an enlarged longitudinal sectional view of a portion of the apparatus of FIGURE 3, the section being taken along a longitudinal plane located as indicated by line 4—4 of FIGURE 5, but, for convenience of illustration, with the mandrel portion removed.

FIGURE 5 is a cross sectional view of the apparatus of the invention, as taken on line 5—5 of FIGURE 3.

FIGURE 6 is a cross sectional view of the apparatus of the invention, as taken on line 6—6 of FIGURE 4, but with the mandrel portion present therein.

FIGURE 7 is an enlarged fragmentary detail sectional view, similar to FIGURE 3a, but showing an alternative construction of the packing sleeve assembly.

The apparatus of the invention is as follows:

Referring first mainly to FIGURE 1, which shows the assembly of the apparatus of the invention suspended in an earth borehole 10 in position for performing drilling, testing, or treating operations, as desired, the principal apparatus components thereof respectively from top to bottom are, the lower end portion of a drill pipe string 11, from which the apparatus is lowered or suspended in the borehole and by means of which it is rotated for drilling operations by conventional drilling rig apparatus (not shown) at the earth surface, a packer section 12 adapted by manipulation of the drill pipe from the earth surface to be set in the borehole to pack off the annular space between the drill stem and borehole wall or to be retracted therefrom, a packer setting and retraction control section 14, the mechanism of which is adapted to be actuated by manipulation of the drill pipe, as aforesaid, an elongated drill collar 16 of increased diameter and weight relative to the drill pipe, packer and control sections thereabove, and a drill bit 18 which is herein illustrated as, but is not necessarily limited to, a conventional roller type bit.

Referring now mainly to FIGURES 3, 4 and 5, the several components of the apparatus will be described in more detail in the same order as hereinbefore mentioned.

Referring first to the tester packer section of the apparatus, this section is provided with a central, axially extending, tubular mandrel 20, having a fluid passage 21 therethrough and connected at its upper end by threads 22 to a tool type of connector joint 24, the box of which is, in turn, threadedly connected, as shown at 26, to a threaded pin 28 carried on the lower end of the drill pipe 11. The packing sleeve assembly of the tester packer, shown generally at 30, coaxially surrounds the exterior upper portion of the mandrel 20, and in its normal retracted condition, as shown in FIGURES 1 and 3, has an inside diameter sufficient to make a relatively loose, freely rotatable, and longitudinally slidable fit upon the mandrel 20.

The before mentioned packing sleeve assembly 30 comprises at least a pair of separate, concentric packing sleeves 32 and 34, such sleeves being made of suitable resilient material such as, for example, heat and oil resistant synthetic rubber or neoprene, preferably unreinforced by any non-resilient means. The inner and outer sleeves 32 and 34 preferably have Shore hardnesses of approximately 70, except for approximately the first 12" of each end of the outer sleeve 34, which end portions preferably should be slightly harder, for example, a Shore hardness of approximately 85.

A relatively short portion of each of the opposite end portions of the concentric packing sleeves 32 and 34 are vulcanized or otherwise suitably bonded together at their mutually contacting inner and outer surfaces, as shown at 36 and 38, and the balance of the length of the mutually contacting or adjacent surfaces therebetween, that is, the outer surface of the inner sleeve 32 and the inner surface of the outer sleeve 34 intermediate the bonded together end portions remain unbonded and free, as illustrated at 40, for separate movement relative to one another. Preferably, a suitable lubricating material, such as talc, is introduced between the intermediate, unbonded surfaces of the sleeves 32 and 34 to maintain such conditions. Such condition and construction has been discovered to impart the desired deformation characteristics to the packing, as it is compressed axially and thereby expanded radially, for proper setting in sealing engagement with a surrounding borehole wall, as hereinafter described.

The upper bonded together end portion 36 of the packing sleeves 32 and 34 is coaxially attached to a combined packing compression ring and swivel connector assembly, shown generally at 42, which encircles the upper end portion of the mandrel 20 and makes a rotatable, but longitudinally fixed connection to the lower end of the before mentioned connector joint 24. The swivel connector assembly 42 comprises a relatively thin inner connector sleeve member 44 having at its upper end an integral, radially outwardly extending annular swivel flange 46 of increased outside diameter relative to the connector sleeve 44, a downwardly facing annular shoulder 48 being thereby formed at the juncture of said connector sleeve 44 and flange. The exterior of the lower cylindrical portion of the connector sleeve member 44 is threaded from the lower end throughout a substantial portion of its length, as shown at 50, and onto such threads is threaded a packing retainer ring 52 having an outside diameter at least equal to or preferably slightly greater than the normal outside diameter of the outer packing sleeve 34. The retainer ring 52 is formed with a relatively thin outer annular lip 54 extending axially downwardly from the outer edge thereof, the lip 54 and the adjacent external surface of sleeve 44 together forming an axially, downwardly facing, annular retaining groove 56. The before mentioned attachment between the upper end of the packing sleeve assembly and the swivel connector assembly is effected by forceably inserting the lower threaded end portion 50 of the attachment sleeve 44 into the bonded together upper end portion 36 of the packing sleeves 32 and 34 to a position in which the edge thereof is firmly seated and protectively contained within the annular retainer groove 56, with bonding of the surfaces of mutual contact thus established between the packing sleeves 32 and 34 and the sleeve connector 52 and inner surface of retainer groove 56, by suitable means and methods well known in the art for tenaciously bonding elastomers of the before mentioned kind to metal surfaces.

While two concentric sleeves 32 and 34 are herein illustrated in the preferred construction of the packing sleeve assembly 30 for average conditions, under some conditions, for example where relatively large boreholes, borehole wall irregularities or other unusual conditions are encountered at the point of desired pack-off, more than two such concentrically arranged sleeves have been found desirable and advantageous. For example, three or more such concentric sleeves may be used, each bonded together at the end portions and attached to end rings in substantially the same manner as hereinbefore described for the two sleeve arrangement. An assembly for three such sleeves is fragmentarily illustrated at 32, 34, and 35 in FIGURE 7.

The before mentioned connector joint 24 interconnecting the drill pipe 11 and the mandrel 20, is provided at its lower end with external threads 76, to which is threadedly connected a swivel coupling nut 78. The coupling nut 78 is formed at the lower end thereof with a radially inwardly extending flange 80 surrounding the sleeve 44 and forming an inner upwardly facing shoulder 82. The swivel nut shoulder 82 is thus positioned in rotational sliding abutment with the before mentioned downwardly facing shoulder 48 of the swivel connector sleeve member 44, thereby supporting the swivel connector 42 from the joint member 24 in a manner restraining it against longitudinal sliding movement, but permitting its free rotational movement relative to the mandrel 20, as aforesaid.

The lower bonded together end portion 38 of the sleeves 32 and 34 is attached in a manner similar to that hereinbefore described in connection with the upper end portion thereof, to a generally annular shaped packer retainer and compression ring member 60 which both rotatably and axially slidably encircles an intermediate portion of the mandrel 20. The ring member 60 is formed with an annular lower end body portion 62 having an outside diameter at least equal to, or preferably slightly greater than the outside diameter of the outer packing sleeve 34 and from which extends coaxially upwardly an inner, relatively thin sleeve member 64 and an outer, shorter, relatively thin annular lip 66, the sleeve member 64 and annular lip 66 together defining an upwardly facing annular retainer groove 68. The outer cylindrical surface of sleeve member 64 is provided with threads or alternatively with suitable knurling, as indicated at 70, upon or over which the lower bonded together end portion 38 of packing sleeves 32 and 34 is forceably applied to a position in which the lower edge of the packing is firmly seated and protectively contained within the annular retainer groove 68. The surfaces of mutual contact thus established between the end portions of the sleeves 32 and 34 and the sleeve member 64 and retainer groove 68 are bonded together in the same manner, as hereinbefore described in connection with the upper end attachment of the packing sleeves.

The bore of the annular body portion 62 of the ring member 60 is provided with an inwardly facing sealing ring groove 70 containing an O-ring seal 71 for making a slidable fluid tight seal between the ring member 60 and the mandrel 20.

A lateral lubrication duct 84, normally closed at its outer end by a threaded plug 86, extends through the ring member 60 and provides means for injecting lubricant under pressure into the clearance spaces above the sealing O-ring 70 between the inner packing sleeve 32 and the mandrel 20.

Referring next to the packer control section 41, best shown in FIGURES 3, 4, 5, and 6, this section comprises an inner, axially extending, slotted, tubular body 90 and an external, concentric tubular housing 92. The upper and lower ends of the inner tubular body 90 are externally threaded at 94 and 96, respectively. Onto the upper threaded end 94 of the tubular body 90 is screwed an annular housing retainer collar 98, and the lower threaded end 96 of the tubular body 90 makes screwed connection into the upper end of the pin portion of a tool joint 99 which, in turn, makes threaded connection at 100 with the tool joint box formed integrally on the upper end of the drill collar 102. In the assembly, as best shown in FIGURE 3, the tubular housing concentrically encloses the tubular body 90 and is retained axially fixed thereon between the upper edge 104 of the tool joint 99 and the lower edge 106 of the retainer collar 98.

The tubular body 90 has formed through its walls a pair of diametrically opposite control slot systems of identical configuration, each such control slot system comprising an elongated longitudinally extending slot portion 110, a relatively shorter longitudinally extending slot portion 112 spaced circumferentially from the before mentioned relatively longer slot 110, and a circumferentially extending slot portion 114 interconnecting the upper end of slot portion 110 with an intermediate section of slot portion 112. The before mentioned tubular housing 92 surrounds and protectively encloses both of the slot systems in the tubular body 90.

The lower end of the mandrel 20 extends downwardly longitudinally slidably into the bore of the inner, slotted, tubular body 90 and carries fixed adjacent an intermediate section thereof a pair of diametrically opposite, radially outwardly extending slot follower lugs, one of which is best shown at 116 in FIGURE 4 and both of which are shown in cross section in FIGURE 6. The follower lugs 116 extend radially outward from the mandrel 20 into the slots a distance substantially equal to the thickness of the walls of the tubular body 90 and by appropriate longitudinal and rotational movement of the mandrel 20 relative to the tubular body 90 are guidedly slidable longitudinally and circumferentially throughout the before described slot systems. For convenience of illustration, the lug 116 is shown in FIGURE 4 at an intermediate position in the circumferentially interconnecting slot portion 114, between the longitudinal slot portions 110 and 112.

As before mentioned, the mandrel 20 is axially slidable within the bore of the slotted tubular body 90, and in the normal running-in condition of the apparatus, that is, when the apparatus is being lowered into a well borehole, the mandrel 20 occupies an upwardly withdrawn position relative to the slotted tubular body 90 approximating that shown in FIGURE 3, but with the follower lugs 116 preferably positioned in the upper ends 117 of the slots 112, and under such conditions, the distance between the top end 120 of the tubular body 90 and the swivel connector 42 is a maximum, and the packing sleeves 32 and 34 are in their most elongated and completely retracted condition, substantially as shown in FIGURES 1 and 3. Preferably, under the latter condition, the packer sleeves 32 and 34 are under slight axial compression sufficient to assist the follower lugs 116 in remaining in the before mentioned positions in the upper ends 117 of the slots 112 during the lowering of the apparatus into the well borehole, thereby locking the packing control against inadvertent setting of the packing during the lowering of the drill string into a well borehole.

When the mandrel 20 is in its most fully inserted position within the tubular body 90, as permitted and limited by the positioning of the follower lugs 116 in or adjacent the bottom ends 111 of the longitudinal guide slot portion 110, the mandrel will occupy a position within the control section of the apparatus, as indicated by the dotted lines 122 and 124, and the axial distance between the swivel connector 42 and the lower packer compression ring member 60 will have been proportionately shortened, resulting in compression of the packing sleeves 32 and 34 axially and the resulting expansion thereof radially, as shown in FIGURE 2.

The upper end of the tubular body 90 is provided with an inwardly facing, annular groove 126 containing an O-ring type seal 128 adapted to make sliding, sealing engagement with the outside cylindrical surface of the mandrel 20. An inwardly facing, annular groove 130 containing an O-ring type seal 132 is formed around the inner surface of the tubular body 90 at a position adjacent to, but below the lower ends 111 of the slotted portions 110, adapted to make sliding, sealing engagement with the external surface of the mandrel 20. The upper O-ring seals 126, 128 and the intermediate O-ring seals 130, 132, respectively, serve to retain lubricant in and exclude borehole fluid from the clearance spaces between the slotted tubular body 90 and the tubular mandrel 20 and the spaces in the control slots 110, 112, and 114.

Inwardly facing, annular grooves 134 and 136 containing O-ring type seal rings are also provided in the inner surfaces of the housing 92 adjacent the upper and lower ends thereof, respectively, for making fluid tight seals between the housing 92 and the slotted tubular body 90 to exclude borehole fluid from the space therebetween and from the slot systems.

In order to impart added strength to the control section of the apparatus of this invention, the housing 92 is preferably slotted longitudinally through diametrically opposite sides thereof for a considerable portion of the length of the housing, circumferentially intermediate the two control slot systems, as indicated at 138 and 140 in FIGURES 5 and 6, and a seam weld laid down in each of such slots attaching the housing 92 along such slots to the outer surface of the tubular body 90. The assembly of tubular body 90 and housing 92 is thus imparted additional strength in lateral bending and axial compression to compensate for the otherwise weakening effects of the control slots 110, 112, and 114.

The operation of the hereinbefore described apparatus of the invention is as follows.

For convenience of description, let it be assumed that the earth borehole 10 has been previously drilled to the depth illustrated in FIGURE 1, and it is now desired to reinsert the drill string including the apparatus of this invention into the borehole 10 for resumption of drilling. For this purpose, the apparatus is assembled as illustrated in FIGURE 3, but with the mandrel 20 positioned longitudinally relative to the control section 14 such that the follower lugs 116 are positioned in their uppermost positions in the upper ends 117 of the slots 112. In this position, during running-in of the tools, the mandrel 20 is in its most withdrawn position relative to the control section 14, and the weight of the control section 14, drill collar 16, and drill bit 18 is suspended therethrough on said follower lugs 116 bearing against the top ends 117 of the slots 112, and the packing sleeves 132 and 134 are in their maximum axially elongated and radially retracted condition, as shown in FIGURES 1 and 3.

Under the foregoing conditions, the drill string including the apparatus of this invention, is lowered into the earth borehole 10 to the position illustrated in FIGURE 1, at which the drill bit 118 is brought into contact with the bottom end of the borehole in readiness for drilling. When the drill bit 18 makes contact with the bottom of the borehole 10 and some of the weight of the drill pipe is applied, the lugs 116 will thereby be caused to move downwardly through the slots 113 the relatively short distance from the position at the top ends 117 to a position at the bottom ends 119 thereof, thereby transferring such applied drill pipe weight through the follower lugs 116 to the body 90 of the control section 14 and, thence, through the tool joint 99, drill collar 102 to the drill bit 118. Such downward movement of the follower lugs 116 to the bottoms 119 of slots 112 and attendant downward movement of the mandrel 20 into the body 90 of the control section 14 is insufficient to effect any appreciable expansion of the packing sleeves 32 and 34. Circulation of drilling fluid may then be started and right hand rotation imparted to the drill pipe for performance of the drilling operation, and such right hand rotation and drilling weight will maintain the follower lugs 116 securely in position in the bottom ends 119 of slots 112 during such drilling. Meanwhile, during such drilling, the packing sleeves 32 and 34 remain retracted and are substantially out of contact with the surrounding borehole wall by reason of the fact that the inside diameter of the borehole is substantially greater than the outside diameter of the packing sleeves. However, by reason of lateral bending or whipping action of the drill stem during drilling, or possibly due to some irregularities in the borehole wall, the packing sleeves may occasionally come into contact with the borehole wall during drilling rotation of the tools. When this occurs, the packing sleeves 32 and 34, because of their freedom to rotate relative to the mandrel 20, as hereinbefore described, will not be forced to rotate relative to the formation, but will remain rotationally stationary relative to the formation so long as the contact between packing sleeves and formation continues. Wear and damage to the packing is thus minimized.

Lubricant introduced through the duct 84 into the clearance spaces between the inner packing sleeve 32 and the mandrel 20 serves to reduce friction and thereby to increase and maintain the freedom of the sleeves 32 and 34 to rotate on the mandrel 20, and also assists in maintaining conditions favorable to proper setting and release of the packing sleeves, as hereinafter described in connection with the testing portion of the operations.

If, upon resumption of drilling, an abnormal rise in drilling fluid pump pressure immediately occurs, this will indicate that the follower lugs 116 were inadvertently positioned in the tops of the elongated slot portions 110 of the control section 14 at the time of resumption of drilling, thereby permitting the packing sleeves 32 and 34 to be compressed and thereby set against the borehole wall, when drilling weight is applied to the drill bit. In such event, this undesirable condition is corrected by picking up the weight of the drill stem sufficiently to lift the drill bit slightly off bottom and then setting it back down into drilling position while maintaining right hand rotation. This will cause the follower lugs 116 to be returned to the slots 112, after which upon reapplying weight to the drill bit the follower lugs 116 will move down and be locked in the lower ends 119 of slots 112 during drilling.

When it is desired to make a formation test, rotation of the drill pipe is temporarily interrupted, and the drill pipe is hoisted upwardly in the borehole a sufficient distance to remove all of the weight from the drill bit, under which conditions the mandrel 20 will move upwardly relative to the slotted sleeve 90, and the follower lugs 116 will thereby be moved upwardly through the slots 112 to rest against the top ends 117 thereof. Next, the drill pipe is imparted slight left hand rotational movement followed by substantially simultaneous lowering of the drill pipe sufficiently to reestablish some weight on the drill bit 18. This will cause the mandrel 20 to rotate to the left and then move downwardly relative to the slotted sleeve 90, thereby moving the follower lugs 116 downwardly out of the tops 118 of slots 112, and thence rotationally through the circumferentially extending slot portions 114 into the top of the longitudinally extending slot portions 110, after which continued downward lowering of the drill pipe will cause the mandrel 20 and follower lugs 116 thereon to move downwardly in the slot portions 110, resulting in downward movement therewith of the swivel connector 42 relative to the packing compression ring member 60 thereby, in turn, imparting axial shortening and compression to the packing rings 32 and 34. Upon continued lowering of the drill pipe and resulting continued lowering of the mandrel 20 and the follower lugs 116 thereon downwardly in the slot portions 110, the mandrel 20 will finally reach a lowered position within the slotted tubular body 90 approximating that shown in dotted lines at 122 and 124, at which latter position the packing sleeves 32 and 34 will have been compressed axially sufficiently to expand them radially, in the form illustrated in FIGURE 2, into sealing engagement with the surrounding wall of borehole 10. The resultant forces thus applied axially through the packer sleeves 32 and 34 necessary for setting the packer, as before mentioned, are transmitted through the control section 14, drill collar section 16, and the drill bit 18 to the bottom end of the borehole 10.

Following the setting of the packer sleeves 32 and 34 into sealing engagement with the wall of the borehole 10, as before described and as illustrated in FIGURE 2, if it is then desired to make a formation test, a bailer or swab may then be run on a wire line into the drill pipe and sufficient drilling fluid removed from the drill pipe to lower the fluid pressure in the annular space in the well borehole below the set packing sleeves 32, 34 enough to permit formation fluids to enter the borehole. A sample of such formation fluids may be obtained by continued bailing or swabbing until such fluids are elevated to the top of the drill pipe, and in some cases, where the formation fluid pressure is sufficiently high, productive flow conditions may be induced.

Instead of bailing or swabbing to remove drilling fluid from the drill string to reduce the hydrostatic pressure in the bottom of the borehole, as hereinbefore described, before setting the packing elements, a floating plug or separator can be introduced into the top end of the drill pipe and pumped down therethrough by means of suitable gas under sufficient pressure to force drilling fluid out of the drill string through the bit and upward through the annular space between drill stem and borehole. When it is estimated that sufficient drilling fluid has thus been displaced from the drill string, then the packing elements may be set, following which the gas previously introduced into the top of the drill pipe is withdrawn or exhausted, thereby reducing the fluid pressure at the bottom of the drill string and in the bottom of the borehole sufficiently to permit formation fluids to enter the borehole, as before described.

When it is desired to discontinue the test, the drill pipe is raised sufficiently to insure raising of the mandrel 20 relative to the tubular body 90 sufficiently to move follower lugs 116 to the tops of the slot portions 110, at which relative position of the mandrel 20, the packing sleeves 32, 34 will have been permitted to return to their fully elongated and retracted shapes, as shown in FIGURES 1 and 3, and under such conditions, the fluid previously supported by the set packer sleeves 32, 34 is released to flow downwardly in the annulus between the borehole walls and the drill string to reestablish the full hydrostatic head of the borehole fluid in the bottom of the borehole and thereby kill any further production of formation fluids.

In the event, for any reason difficulties are had in performing the latter operation of retracting the packing sleeve 32, 34 from their expanded set condition, drilling fluid under pressure may be introduced through the drill string and down through the drill bit to the bottom of the borehole 10, thereby reestablishing the necessary fluid pressure in the bottom of the borehole required to kill production, if any, and to facilitate release of the set packing.

If, instead of making a formation production test, as hereinbefore described, it is desired to treat the drilled formations adjacent the bottom of the well borehole 10 with treating fluids, such as for example acid, the packer apparatus of this invention may be manipulated and set in the same manner as hereinbefore described preparatory to the making a formation test. However, instead of performing the formation sampling step and before the packing is set, the treating fluid may be introduced down through the drill pipe under pressure sufficient to displace the drilling fluid downwardly therethrough and up into the surrounding annular space between the borehole walls and the drill string. When the treating fluid has been thus introduced through the drill string in sufficient quantity to approximately reach the bottom end of the drill string, that is, reach the drill bit 18, then the packing sleeves may be set in sealing engagement with the surrounding well borehole in the manner hereinbefore described, while maintaining the treating fluid pressure within the drill stem, and then after the packing sleeves are set, the treating fluid pressure may be increased through the drill pipe sufficient to force it out through the drill bit 18 into the bottom of the borehole 10 and cause it to penetrate the surrounding pervious formations.

In withdrawing the apparatus of the invention from the well borehole following either a formation test or a formation treating operation, as hereinbefore described, the drill pipe is hoisted upwardly with the result that the mandrel 20 is drawn upwardly sufficient to move the follower lugs 116 upwardly through the slot portions 110 into abutment with the top ends thereof or possibly in abutment with the top ends 118 of the slots 112, under which conditions the packing section 12, control section 14, drill collar 16, and drill bit 18 are again suspended from the drill pipe. The drill stem including the apparatus of this invention may then either be withdrawn from the borehole or drilling may be resumed, as before described.

The construction of the packing portion of the apparatus of this invention of two separate packing sleeves 32 and 34, as hereinbefore described, has been found to result in a packing assembly which takes an annularly convoluted or bellows like, radially expanded shape when compressed axially, having an appearance as illustrated in FIGURE 2. Assembling the packing of two or more concentric, separate resilient sleeves, as shown at 32 and 34 in FIGURES 3 and 3a or as shown at 32, 34, and 35 in FIGURE 7, unbonded together throughout substantially their entire mutually contacting surfaces apparently contributes importantly to the packer assuming the before described shape when set. The packing sleeves may be composed of an elastomer sold under the trade name of Hycar. For packing sleeves having outside diameters of approximately 6" in their retracted condition, it has been found that a length of approximately five feet and wall thicknesses of each sleeve of approximately ¼" are satisfactory for effective action, as hereinbefore described.

While a preferred embodiment of the invention has been herein shown and described, which is capable of fulfilling the objects and advantages sought, it is to be understood that modifications and variations may be made by those skilled in the art without departing from the scope of the invention, as defined in the appended claims.

What is claimed is:

1. In an earth formation drilling and testing tool, apparatus comprising:

a tubular drill stem including a drill bit at the lower end thereof;

a slip joint means located in said drill stem adjacent said drill bit, said slip joint means including;

a pair of concentric, longitudinally telescopically slidable coupling elements, one of such coupling elements being fixedly connected to the drill stem portion thereabove and the other of said coupling elements being fixedly connected to said drill stem portion therebelow;

means interlocking said coupling elements permitting limited longitudinal shortening and lengthening telescopic sliding movement but at all positions relative to one another preventing continuous rotation of said coupling elements, relative to one another;

a tubular mandrel having a packing supporting portion of uniform outside diameter fixed to one of said coupling elements and slidable longitudinally relative to the other of said coupling elements;

a first concentric annular shoulder carried by one of said coupling elements adjacent one end portion of said mandrel;

a second concentric annular shoulder carried by the other of said coupling elements adjacent the other end portion of said mandrel and spaced apart axially from said first annular shoulder, said shoulders being thereby movable longitudinally toward and way from one another along said packing supporting portion of said mandrel by such relative longitudinal telescopic shortening and lengthening movement, respectively, of said coupling elements;

and an elongated packing sleeve on said packing supporting portion of said mandrel intermediate said shoulders, said packing sleeve being adapted to be compressed axially between said shoulders and thereby expanded radially into sealing engagement with a surrounding borehole wall upon such shortening movement of said coupling elements.

2. In an earth formation drilling and testing tool, apparatus comprising:

a tubular drill stem including a drill bit at the lower end thereof;

slip joint means located in said drill stem adjacent said drill bit, said slip joint means including;

a pair of concentric, longitudinally telescopically slidable coupling elements, one of such coupling elements being fixedly connected to the drill stem portion thereabove and the other of said coupling elements being fixedly connected to said drill stem portion therebelow;

means interlocking said coupling elements permitting limited longitudinal shortening and lengthening telescopic sliding movement, but at all positions preventing continuous rotation of said coupling elements, relative to one another;

a tubular mandrel having a packing supporting portion of uniform outside diameter fixed to one of said coupling elements and slidable longitudinally relative to the other of said coupling elements;

a first concentric annular shoulder carried by one of said coupling elements adjacent the other end portion of said mandrel;

a second concentric annular shoulder carried by the other of said coupling elements adjacent the other end portion of said mandrel and spaced apart axially from said first annular shoulder, said shoulders being thereby movable axially toward and away from one another along said packing supporting portion of said mandrel by such relative axial telescopic shortening and lengthening movement, respectively, of said coupling elements;

an elongated packing sleeve concentrically surrounding said packing supporting portion of said mandrel intermediate said shoulders;

said packing sleeve in its normal unexpanded condition being rotationally free to permit rotation of said packing sleeve and said drill stem relative to one another;

and said packing sleeve being adapted to be compressed axially between said shoulders and thereby expanded radially into sealing engagement with a surrounding borehole wall upon telescopic sliding shortening movement of said coupling elements in said slip joint.

3. Apparatus according to claim 2 and:

an annular collar member attached to each end of said packing sleeve, each said collar member and said packing sleeve being mounted concentrically rotatable relative to said packing supporting portion of said mandrel;

and swivel connector means interconnecting the upper one of said collar members and said packing supporting portion with freedom for concentric rotation but restrained against axial sliding movement relative thereto.

4. Apparatus according to claim 2 and in which said packing sleeve in said normal unexpanded condition has an outside diameter less than that of said shoulders.

5. Apparatus according to claim 4 in which said packing sleeve comprises:

a plurality of separate coextensive concentric, resilient sleeve members separate from one another throughout substantially their entire length;

an annular collar member bonded to each end of said packing sleeve;

and each said collar member and said sleeve being mounted concentrically rotatable relative to said packing supporting portion of said mandrel.

6. Apparatus according to claim 5 in which the upper one of said annular collar members includes swivel connector means interconnecting said collar member and said packing supporting portion of said mandrel with freedom for concentric rotation, but restrained against axial sliding movement relative thereto.

7. In an earth formation drilling and testing tool, apparatus comprising:

a tubular drill stem including a drill bit at the lower end thereof;

a slip joint means located in said drill stem adjacent said drill bit, said slip joint means including;

a pair of concentric, longitudinally telescopically slidable coupling elements, one of such coupling elements being fixedly connected to the drill stem portion thereabove and the other of said coupling elements being fixedly connected to said drill stem portion therebelow, and interlocking means for said coupling elements permitting limited longitudinal shortening and lengthening telescopic sliding movement but preventing continuous rotation of said coupling elements, relative to one another, said interlocking means including;

a guide slot in one of said coupling elements, said guide slot having a relatively long longitudinally extending slot portion, a relatively short longitudinally extending slot portion, and a relatively short circumferentially extending slot portion, said relatively long and short slot portions being parallel and separated circumferentially of said elements, and said circumferentially extending portion joining one end of said relatively long slot portion with an intermediate section of said relatively short slot portion;

a follower lug fixed to and extending laterally from the other of said coupling elements into said slot, said follower lug being guidedly slidable along the length of said slot, whereby upon effecting such sliding movement of said follower lug along said relatively long slot portion of said guide slot, maximum lengthening and shortening telescopic sliding movement between said coupling elements is permitted, and whereby upon displacement of said lug therefrom circumferentially through said circumferentially extending slot portion into said relatively short slot portion, movement of said lug along said relatively short slot portion permits minimum lengthening and shortening telescopic sliding movement between said coupling elements, and said elements are thereby locked substantially in their maximum longitudinally extended positions and whereby said coupling elements are also locked against rotation relative to one another when said lug is positioned at either end of said relatively short slot portion of said guide slot;

an elongated, resilient packing body surrounding the exterior of said drill stem adjacent said slip joint means;

and means connected to said coupling elements of said slip joint means and actuatable by telescopic slidable shortening movement of said coupling elements relative to one another to compress said packing body longitudinally and thereby expand said packing body laterally into sealing engagement with a surrounding borehole wall.

8. Apparatus according to claim 7 in which said packing body comprises:

at least a pair of resilient, concentric, substantially axially coextensive sleeve members, said sleeve members being separate from one another except for a relatively axially short portion thereof adjacent each opposite end thereof, whereby at least the intermediate portions of said sleeves are resiliently slidably movable relative to one another.

9. Apparatus according to claim 7, and an annular ring coaxially attached to each opposite end of said packing body, said rings being rotatably retained on one of said coupling elements upon which said sleeve member is mounted.

10. Apparatus according to claim 9 and swivel coupling means to restrain the upper one of said rings from axial sliding movement on said one of said coupling elements but permitting axial sliding movement of the lower one of said rings on said one of said coupling elements.

11. Apparatus according to claim 10 and duct means in one of said rings for introducing lubricant under pressure from the exterior thereof into the space intermediate said sleeve members and said one of said coupling elements upon which said sleeve elements are mounted.

References Cited by the Examiner

UNITED STATES PATENTS

| | | | |
|---|---|---|---|
| Re. 24,236 | 11/1956 | Bedingfield | 166—196 |
| 2,082,111 | 6/1937 | Layne | 175—325 |
| 2,449,514 | 9/1948 | Scoville | 166—196 |
| 2,630,864 | 3/1953 | Lynes | 166—190 |
| 2,650,664 | 9/1953 | Sorensen | 166—139 |
| 2,701,019 | 2/1955 | Steed | 166—196 |
| 2,738,014 | 3/1956 | Lynes | 166—201 |
| 3,059,695 | 10/1962 | Barry et al. | 166—3 |
| 3,115,189 | 12/1963 | Althouse et al. | 166—240 |
| 3,131,778 | 5/1964 | Emerson | 175—321 |

CHARLES E. O'CONNELL, *Primary Examiner.*

BENJAMIN HERSH, *Examiner.*